Patented Apr. 7, 1936

2,036,882

UNITED STATES PATENT OFFICE 2,036,882

PROCESS OF MAKING PAPER

Donald K. Pattilloch and Isabelle B. Pattilloch, Boston, Mass., assignors to Pattilloch Processes, Inc., Boston, Mass., a corporation of Massachusetts No Drawing. Application June 21, 1934, Serial No. 731,672

4 Claims. (Cl. 92—21)

This invention relates to paper making and particularly to the making of paper from a furnish containing amylaceous bonding material, such for instance, as starch.

Starch, whether in the raw or uncooked state, or in the cocked or gelatinized form, has a chemical structure similar to that of the cellulose fibre. Raw starch, however, has a physical structure different from that of the cellulose fibre, while the cooked starch, which is colloidal or gelatinous in form, has not only the same chemical structure as the gelatinized portion of hydrated fibre, but also has the same physical characteristics.

When gelatinized starch is added to fibre-water mixture some, at least, of the gelatinized starch articles attach themselves to the hydrated cellulose fibre and thus augment the gelatinous condition of the cellulose fibre. In the case of raw starch the separate ungelatinized starch particles become separately attached to the hydrated fibre and subsequently are partially or completely gelatinized on the paper driers (raw starch in its ungelatinized state being in the nature of very fine granular material), while in the case of cooked starch, which is colloidal or gelatinous in form, the attaching of the cooked starch to the cellulose fibre results in building upon the cellulose fibre a coating of the starch gel as distinguished from the attachment of separate spaced starched particles in ungelatinized form to the fibre as in the case of raw starch. In the latter case the augmenting of the gelatinous condition of the fibre by the starch particles does not take place until the starch particles have gelatinized on the paper driers. Since cooked starch has the same chemical and physical characteristics as the gelatinized portion of the hydrated fibre, the operation of building up the coating of cooked starch gel on the gelatinized surface of the hydrated fibre has the effect of swelling or increasing the thickness of the gelatinized portion of the fibre, thereby producing an increased hydration or gelatinization of the fibre which reflects directly in the running characteristics of the fibre on the paper machine.

It is generally recognized that the cellulose fibres in a fibre-water mixture are negatively-charged or, in other words, have a negative surface charge of electricity.

Experiments which we have conducted indicate that when amylaceous bonding material, such as starch in any of its various forms, is added to a fibre-water mixture the starch particles, whether in suspensoidal form or colloidal or gelatinous form, are also negatively-charged, and the negative charge of the starch particles, when in the form of a suspensoid, as in the case of raw starch, is less than when in the form of a colloid or gel, as in the case of cooked starch, and that the closer that a starch particle approaches a colloidal or gel state the more pronounced will be its negative charge. Since both the cellulose fibres and the starch particles carry negative electrical charges there will be a tendency for these particles to repel each other, and as a result any chemical-physical bonding action between the starch and the cellulose fibre is normally decreased by the amount which these negatively-charged particles tend to repel each other, and this amount increases as the surface charge effect on the particles increases. In other words, the greater the electrical charges the less the retention or bonding since the more highly the particles are negatively-charged the greater will be the electrical repelling action between them.

One purpose of the present invention is to provide a novel method of making paper by which starch in gelatinized form may be completely bonded to the hydrated cellulose fibre to produce a chemical hydration and this end is attained by adding to the fibre-water mixture containing the usual aluminum sulphate (which is generally known as papermaker's alum) and gelatinized starch, a suitable alkali such, for instance, as sodium aluminate or sodium metasilicate which reacts with the aluminum sulphate to produce a precipitate, usually in flocculent form, that coacts and unites with the gelatinized starch to form a mixed precipitate by which the gelatinized starch is bonded to the gelatinous surface of the hydrated fibres. The addition of sodium metasilicate produces a precipitate of aluminum silicate, a precipitate which carries a positive charge of electricity; and the addition of sodium aluminate produces a precipitate of aluminum hydrate, the particles of which also carry positive charges of electricity. This positively-charged precipitate, whether produced by the addition of sodium aluminate or by the addition of the sodium metasilicate, coacts with the negatively-charged gelatinized starch and the negatively-charged cellulose fibre to dispel the electrical repulsion between the gelatinized starch particles and the cellulose fibre and replace such electrical repulsion by an electrostatic bond that augments the normal chemical-physical bond between the starch particles and the cellulose fibre, such electrostatic bond resulting from the satisfaction of the negative electrical surface charges on both the fibres and the gelatinized starch particles by the positively-charged particles of the precipitate.

In carrying out our invention we propose to add such an amount of the sodium metasilicate or sodium aluminate as to produce a sufficient quantity of the positively-charged particles for the complete satisfaction of the negative electrical surface charges on the gelatinized starch particles, and in this way a complete and permanent bond between the gelatinized starch and the cellulose fibre is produced.

From experiments which we have conducted we find that the minimum amount of sodium aluminate or sodium metasilicate which can be used to produce the desired effect is approximately one percent (1%) although it will be understood that this amount will be increased as the amount of gelatinized starch which is used increases.

The sodium aluminate or sodium metasilicate or other suitable alkali which is used in carrying out this process is incorporated in the furnish subsequent to the beater operation and in addition to, but not as a substitute for part or all of any ingredient, such as aluminum sulphate, generally known as paper makers' alum, which is used in normal papermaking operations, so that the carrying out of our process does not involve any diminution in the amount of aluminum sulphate normally used.

In fact, we have found it advantageous to use an excess of aluminum sulphate over that necessary for normal papermaking requirements in order that the addition of the one percent (1%) or more of sodium aluminate, sodium metasilicate or other suitable alkali to the fibre-water mixture will not raise the pH value above 7.0 pH at the point of paper web formation.

Since cooked starch is colloidal or gelatinous in form and has the same chemical and physical characteristics as the gelatinized surface of the hydrated fibre, the bonding of the colloidal or gelatinous starch to the hydrated fibre by the combined effect of the physical-chemical bonding action and the electrostatic bonding action results in applying to the jelly-like surface of the hydrated fibre an additional coating or thickness of jelly-like colloidal starch, and this has the effect of increasing the gelatinized surface of the hydrated fibre. As the thickness of the jelly-like wall on the fibre increases, the effect is that of swelling or an increased hydration effect, and the water held on and by the fibre is much slower to separate. This will normally necessitate either a slower operation of the paper machine to accommodate water removal, or else the formation of a thinner jelly-like wall on the fibre surface to start with, which thinner gel wall can be secured by a decreased mechanical hydration of the fibre. Such decreased mechanical hydration not only results in the saving of time and power, but also results in a longer fibre, which fibre when treated by the process of this invention produces a paper of greater tensile and tearing strength, and which has less curling tendencies and greater folding endurance.

We prefer to use a cooked or gelatinized starch product and to add the starch to the beater as our experiments have shown that by the use of such material in beater addition we secure the maximum results possible by this invention. As stated above, the gelatinized starch has substantially the same physical and chemical structure as the gelatinized surface of the hydrated fibre, and the addition of gelatinized starch in the beater permits a complete admixture of the starch with and dispersion on the cellulose fibre so that upon subsequent electrostatic bonding of the gelatinized starch to the fibre surface by the addition of suitable aluminate the super-imposition of the chemical gel of the starch on the mechanically gelatinized fibre surface gives a more perfect combined gelatinized surface than is possible by other methods.

The relative amount of gelatinized starch and metasilicate or sodium aluminate may vary more or less depending upon the results to be produced. As stated above we find that in order to produce satisfactory results it is necessary to use at least approximately one percent (1%) of the sodium aluminate or metasilicate. The amount of gelatinized starch used may vary from one percent (1%) up and, generally speaking, an increase in the amount of gelatinized starch employed requires an increase, though in lesser amount, of the sodium aluminate or metasilicate. The proportions, however, of gelatinized starch and sodium aluminate or metasilicate may vary widely without departing from the invention and will also be varied more or less dependent on the nature of other ingredients in the furnish. As the percentage of such starch addition is increased, with a corresponding increase in the negatively-charged particles in the fibre-water mixture, an increasing amount of the metasilicate or sodium aluminate must be added to produce sufficient positively-charged colloids or particles for the complete satisfaction of the negative electrical surface charges on the fibre and gelatinized starch particles.

Experiments which we have made indicate that in the practice of our invention the amount of retention of the starch particles in the paper is not affected appreciably by the size of the starch particle; and although the addition of gelatinized starch to the beater results in breaking the starch up into minute particles yet the beater addition has the advantage that the mixing action of the beater promotes excellent dispersion of the gelatinized starch particles throughout the beater.

The use of gelatinized starch, which is a true colloid, gives superior results because, as stated above, colloidal starch particles or gel have a high negative charge and are, therefore, highly reactive electrostatically so that under properly controlled conditions of electrostatic bonding the colloidal or gel starch bonds itself more perfectly to the gelatinized cellulose fibre thereby securing a better chemical hydration effect.

As stated above the use of gelatinized starch having the same chemical-physical characteristics as the gelatinized surface of the hydrated cellulose fibres effects the combination of the starch gel and the fibre surface gel into an integral whole to give superior results.

The amount of gelatinized starch or other amylaceous bonding material which is used will vary according to the results desired. In various experiments which we have conducted we have used about 20 pounds of gelatinized amylaceous bonding material to 1000 pounds of fibre.

Experiments which we have conducted also show that the successful practice of the improved method is not limited to maintaining the pH value of the fibre-water mixture at any predetermined level although best results are secured where the pH value is approximately at the average isoelectric point of the contents of the furnish.

We have found that the process can be sucfully carried out with a fibre-water mixture having a pH value as high as 7 in acid furnishes or as low as 4.5. An advantage resulting from carrying out the method with the furnish maintained at the higher pH levels of 5.5 to 7 is that it produces a paper having increased permanent stability over paper made with a more acid furnish. It is well known that the greater the acidity of the pulp from which paper is made the greater will be the chemical deterioration of the paper, and by carrying out our process in connection with fibre-water mixture having a pH value at these high levels (5.5 to 7) a much more stable paper is produced and one which is not subject to the chemical deterioration that takes place in a paper made from a more acid furnish.

The process of this invention is to be distinguished from ordinary sizing operations in the paper-making art as the purpose of the invention is to provide an improved method of augmenting the mechanical hydration of the cellulose fibre by a chemical hydrating effect, such improved method consisting in building up the gelatinized portion of the mechanically-hydrated fibre by the incorporation therewith of particles of bonding material having the same chemical structure as the gelatinized portion of the fibre, and doing this through the medium of the combined effect of the chemical-physical bonding action and an electrostatic bonding action between the similarly constituted fibre and starch particle.

Paper made according to this process is more stable than other papers as it ages, and in carrying out the process a noticeable reduction of "sheet static" is to be observed on the dry end of the paper machine. We attribute this to the fact that by the practice of our invention the electrical surface charges on the ingredients have been neutralized.

We claim:

1. The improvement in the manufacture of paper which comprises beating cellulose fibres, aluminum sulphate and gelatinized starch in a beater to form a fibre furnish, and after the discharge of the furnish from the beater adding sodium aluminate whereby the gelatinized starch is bonded to the beaten fibres by a mixed precipitate of aluminum hydrate and gelatinized starch.

2. The improvement in the manufacture of paper which comprises beating cellulose fibres, aluminum sulphate and gelatinized starch in a beater to form a fibre furnish, and after the discharge of the furnish from the beater, adding at least about 1% of sodium aluminate, sufficient aluminum sulphate having been used to react completely to precipitate the alumina from the aluminate whereby the gelatinized starch is bonded to the beaten fibres by a mixed precipitate of aluminum hydrate and gelatinized starch.

3. The process of making paper wherein the fibres per se are only slightly hydrated, said process being characterized by beating the fibre furnish containing fibres, aluminum sulphate, and gelatinized starch, to the desired extent to secure a thinner gel wall on the fibres than would normally be provided and compensating for the thinness of the gel wall by adding to the furnish after it has left the beater the necessary amount of sodium aluminate to react with the aluminum sulphate already present to produce a flocculent mixed precipitate containing gelatinized starch and hydrated alumina and an additional film of this precipitate on the thin gel wall of the fibres to augment the gelatinous structure thereof and to give a chemical hydration effect.

4. The improvement in the manufacture of paper which comprises beating cellulose fibres, aluminum sulphate and gelatinized starch in a beater to form a fibre furnish, and after the discharge of the furnish from the beater adding an alkaline material selected from a group consisting of sodium aluminate and sodium metasilicate which reacts with the aluminum sulphate to produce a precipitate of an aluminum compound that unites with the gelatinized starch and forms a mixed precipitate by which the gelatinized starch is bonded to the gelatinous surface of the hydrated fibre.

DONALD K. PATTILLOCH.
ISABELLE B. PATTILLOCH.